United States Patent [19]

Rarick

[11] Patent Number: 5,504,915
[45] Date of Patent: Apr. 2, 1996

[54] MODIFIED WALLACE-TREE ADDER FOR HIGH-SPEED BINARY MULTIPLIER, STRUCTURE AND METHOD

[75] Inventor: Leonard D. Rarick, San Marcos, Calif.

[73] Assignee: Hyundai Electronics America, San Jose, Calif.

[21] Appl. No.: 102,683

[22] Filed: Aug. 5, 1993

[51] Int. Cl.[6] ........................................ G06F 7/52
[52] U.S. Cl. .................. 395/800; 364/754; 364/759; 364/760; 364/DIG. 2; 364/258; 364/258.1; 364/258.2
[58] Field of Search ..................... 395/800, 760, 395/754, 758, 719; 364/760, 754, 758, 759

[56] References Cited

U.S. PATENT DOCUMENTS

| | | | |
|---|---|---|---|
| 4,660,165 | 4/1987 | Masumoto | 364/787 |
| 4,839,848 | 6/1989 | Peterson et al. | 364/757 |
| 4,897,809 | 1/1990 | Shahriary et al. | 364/784 |
| 4,901,270 | 2/1990 | Galbi et al. | 364/786 |
| 4,910,508 | 3/1990 | Yamazaki | 340/825.9 |
| 5,036,483 | 7/1991 | Virtue | 364/786 |
| 5,265,043 | 11/1993 | Naini et al. | 364/757 |
| 5,347,482 | 9/1994 | Williams | 364/757 |

OTHER PUBLICATIONS

Goto et al, ("A 54×54-b Regularly Structured Tree Multiplier") Sep. 1992; IEEE, pp. 1229–1235.
Nagamatsu et al. (A 15–ns 32×32–b CMOS Multiplier with an Improved Parallel Structure Apr. 1990.
Mori et al. "A 10–ns 54×54 b parallel Structured Full Array Multiplier with 0.5 μm CMOS" Apr. 1991.
Wang et al "An Architecture for Parallel Multipliers" IEEE 1990, pp. 403–407.
Montoye et al. "An 18ns 56–bit Multiplier–Adder Circuit" pp. 46–47, 262.
Pang, K. F., Architectures for Pipelined Wallace Tree Multiplier–Accumulators. IEEE pp. 247–250 (1990).
Brent et al., "A Regular Layout for Parallel Adders," *IEEE Transactions on Computers*, C–31(3):260–264, Mar. 1982.
Takagi et al., "High–Speed VLSI Multiplication Algorithm with a Redundant Binary Addition Tree," *IEEE Transactions on Computers*, C–34 (9):789–796, Sep. 1985.
"Computer Arithmetic," pp. A–1 through A–66.

*Primary Examiner*—Alyssa H. Bowler
*Assistant Examiner*—L. Donaghue
*Attorney, Agent, or Firm*—Townsend and Townsend and Crew

[57] ABSTRACT

A carry-save adder for use in a binary multiplier with a reduced number of full adder stages. The carry-save adder is for summing columns of binary data and is implemented with a plurality of one-bit and two-bit full adders. The one-bit and two-bit full adders are configured in a plurality of interconnected modified Wallace-Tree adders, each modified Wallace-Tree adder for summing binary data bits from one or more columns and generating a partial sum and a partial carry. Each modified Wallace-Tree adder has a plurality of stages comprising a combination of one-bit and two-bit full adders for reducing the number of the binary data bits, the last stage comprising a single one-bit full adder for generating the partial sum and partial carry results. A plurality of conductors interconnects the stages of each modified Wallace-Tree adder with stages in the same modified Wallace-Tree adder and with stages in other modified Wallace-Tree adders.

15 Claims, 17 Drawing Sheets

| 24 | | | 26 | |
|---|---|---|---|---|
| Ci | A | B | Co | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

(Prior Art)

| AI | AO | BI | BO | Ci=0 | | | Ci=1 | | |
|---|---|---|---|---|---|---|---|---|---|
|  |  |  |  | Co | SI | SO | Co | SI | SO |
| 0 | 0 | 0 | 0 | 0 | 0 | 0 | 0 | 0 | 1 |
| 0 | 0 | 0 | 1 | 0 | 0 | 1 | 0 | 1 | 0 |
| 0 | 0 | 1 | 0 | 0 | 1 | 0 | 0 | 1 | 1 |
| 0 | 0 | 1 | 1 | 0 | 1 | 1 | 1 | 0 | 0 |
| 0 | 1 | 0 | 0 | 0 | 0 | 1 | 0 | 1 | 0 |
| 0 | 1 | 0 | 1 | 0 | 1 | 0 | 0 | 1 | 1 |
| 0 | 1 | 1 | 0 | 0 | 1 | 1 | 1 | 0 | 0 |
| 0 | 1 | 1 | 1 | 1 | 0 | 0 | 1 | 0 | 1 |
| 1 | 0 | 0 | 0 | 0 | 1 | 0 | 0 | 1 | 1 |
| 1 | 0 | 0 | 1 | 0 | 1 | 1 | 1 | 0 | 0 |
| 1 | 0 | 1 | 0 | 1 | 0 | 0 | 1 | 0 | 1 |
| 1 | 0 | 1 | 1 | 1 | 0 | 1 | 1 | 1 | 0 |
| 1 | 1 | 0 | 0 | 0 | 1 | 1 | 1 | 0 | 0 |
| 1 | 1 | 0 | 1 | 1 | 0 | 0 | 1 | 0 | 1 |
| 1 | 1 | 1 | 0 | 1 | 0 | 1 | 1 | 1 | 0 |
| 1 | 1 | 1 | 1 | 1 | 1 | 0 | 1 | 1 | 1 |

FIG. 6a.

(Prior Art)

64

| CIRCUIT TYPE | OUTPUT PORT | DELAY TIME NSEC |
|---|---|---|
| ONE-BIT FULL ADDER | S | 1.4 |
| | Co | 1.0 |
| TWO-BIT FULL ADDER | S0 | 1.4 |
| | S1 | 1.6 |
| | Co | 1.4 |

| 96 | 92 | 94 | 98 |
|---|---|---|---|
| 3 | 1 | 1 | 0 |
| 4 | 2 | 2 | 0 |
| 5 | 3 | 2 | 1 |
| 6 | 3 | 3 | 0 |
| 7 TO 8 | 4 | 3 | 1 |
| 9 | 4 | 4 | 0 |
| 10 TO 13 | 5 | 4 | 1 |
| 14 TO 19 | 6 | 5 | 1 |
| 20 TO 21 | 7 | 5 | 2 |
| 22 TO 28 | 7 | 6 | 1 |
| 29 TO 35 | 8 | 6 | 2 |
| 36 TO 42 | 8 | 7 | 1 |
| 43 TO 58 | 9 | 7 | 2 |
| 59 TO 64 | 9 | 8 | 1 |
| 64 TO 94 | 10 | 8 | 2 |
| 95 TO 96 | 11 | 8 | 3 |

*FIG. 10.*

| VARIATION # | 1 | 2 | 3 | 4 | 5 | 6 | 7 | 8 | 9 | 10 |
|---|---|---|---|---|---|---|---|---|---|---|
| FA { S:[1] | [1] | [1] | [1] | [2] | [1] | [1] | [2] | [1] | [2] | [2] |
| FA { Co:[2] | [1] | [1] | [2] | [1] | [1] | [2] | [1] | [2] | [1] | [2] |
| TFA { SO:[1] | [1] | [2] | [1] | [1] | [2] | [2] | [1] | [2] | [2] | [2] |
| TFA { SI:[2] | [2] | [1] | [2] | [1] | [1] | [2] | [2] | [1] | [1] | [1] |
| TFA { Co:[4] | [2] | [2] | [2] | [2] | [1] | [1] | [1] | [1] | [1] | [1] |

MODIFIED WALLACE-TREE ADDER FOR HIGH-SPEED BINARY MULTIPLIER, STRUCTURE AND METHOD

BACKGROUND OF THE INVENTION

This invention relates to a method and apparatus for digital multiplication, and in particular to a method and apparatus for implementing the carry-save adder in a binary multiplier.

The binary multiplier is a key element in digital computers that are used for computationally intensive calculations. The multiply function requires complex circuitry for fast implementation, and can therefore be a bottleneck to speed. Thus, performance improvements in the binary multiplier directly affect computer performance in computationally intensive applications. Typical binary multipliers incorporate the carry-save adder as a basic building block. Using Wallace-Tree binary adders (WTAs) is one form of implementing the carry-save adder, and is an integral element in the efficient implementation of high-speed binary multipliers. The Wallace-Tree adder performs the intermediate column addition calculation, taking the multiplier preliminary product results and generating the partial sum and partial carry associated with the columnar data. The WTA produces one pair of partial sum and carry; one WTA is required per input data column. Furthermore, in an M-bit by N-bit multiplier, N+M−1 such WTAs are required, with up to N bits of input per WTA. The Wallace-Tree adder employs the one-bit full adder (FA) as the basic building block. For the one-bit full adder, three input data bits yield two output data bits, the sum and carry.

The WTA comprises an array of FAs, configured in a series of stages. It reduces the column data from the initial size (N bits) down to the required pair of bits, the partial sum and partial carry. The FA bit reduction characteristics (i.e. three-to-two) determine the number of FA stages required in a WTA. And since the number of stages required in a given computation directly impacts the overall speed, the implementation of the WTA is a key to the throughput speed.

The three-to-two bit reduction characteristics of the FA implementation is such that the number of FA stages in the WTA is proportional to the log of the number of input bits. For specific examples: six bits requires three stages, thirty-two bits requires eight stages, and sixty-four bits requires ten stages. The number of gate delays per FA is implementation dependent. Nevertheless, as the number of bits gets large, the number of FA stages, and therefore the net delay through the multiplier, gets large. Thus, the number of input bits materially affects WTA speed and, as a consequence, processor speed. Therefore, any reduction in the number of FA stages required to implement a WTA would materially improve the throughput speed of a given binary multiplier.

SUMMARY OF THE INVENTION

According to the invention, a carry-save adder with a reduced number of full adder stages is described. The carry-save adder is for summing sets or columns of binary data and generating a partial sum and a partial carry for each column. The binary data bits of a particular column are of the same order of magnitude. The binary data bits in different columns differ in order of magnitude, adjacent columns differing by one order of magnitude in an ascending order. The carry-save adder comprises a plurality of one-bit and two-bit full adders. The one-bit and two-bit full adders are configured in a plurality of interconnected modified Wallace-Tree adders (set adders), each modified Wallace-Tree adder for summing binary data bits from one or more columns and generating a partial sum and a partial carry. The number of modified Wallace-Tree adders is equal to the number of columns of binary data. Each modified Wallace-Tree adder has a plurality of stages comprising a combination of one-bit and two-bit full adders for reducing the number of the binary data bits, the last stage comprising a single one-bit full adder for generating the partial sum and partial carry results. A plurality of conductors interconnects the stages of each modified Wallace-Tree adder with stages in the same modified Wallace-Tree adder and with stages in other modified Wallace-Tree adders, the conductors generally confined to connecting input and output terminals which receive and transmit binary data bits of the same order of magnitude.

The invention also may be described in terms of a method of summing a plurality of binary data bits. Initially, the binary data bits are organized into sets, each set containing all of the binary data bits having the same order of magnitude. Each set of binary data bits is then input into at least one modified Wallace-Tree adder, each modified Wallace-Tree adder comprising a plurality of interconnected one-bit and two-bit full adders. The number of binary data bits is then reduced by means of successive stages of the one-bit and two-bit full adders, thereby generating a partial sum result and a partial carry result for each set of binary data bits.

A further understanding of the nature and advantages of the present invention may be realized by reference to the remaining portions of the specification and the drawings.

BRIEF DESCRIPTION OF THE DRAWINGS

FIG. 2A is a function table of a one-bit full adder showing output signal characteristics versus input signal levels.

FIG. 6A is a function table of a two-bit full adder showing output signal characteristics versus input signal levels.

FIG. 6C is a table that shows the results of a sample calculation of the performance of a particular implementation of a one-bit full adder and a two-bit full adder.

FIG. 10 is a table that compares the number of one-bit full adder stages required in a Wallace-Tree adder to the number of adder stages required in a modified Wallace-Tree adder versus the number of bits of input data.

FIG. 11 is a table that shows the possible combinations of interconnections between a pair of one-bit/two-bit full adder stages and a single one-bit full adder stage in a Wallace-Tree adder.

DESCRIPTION OF THE SPECIFIC EMBODIMENTS

Binary Multiply Function

Figure 1:
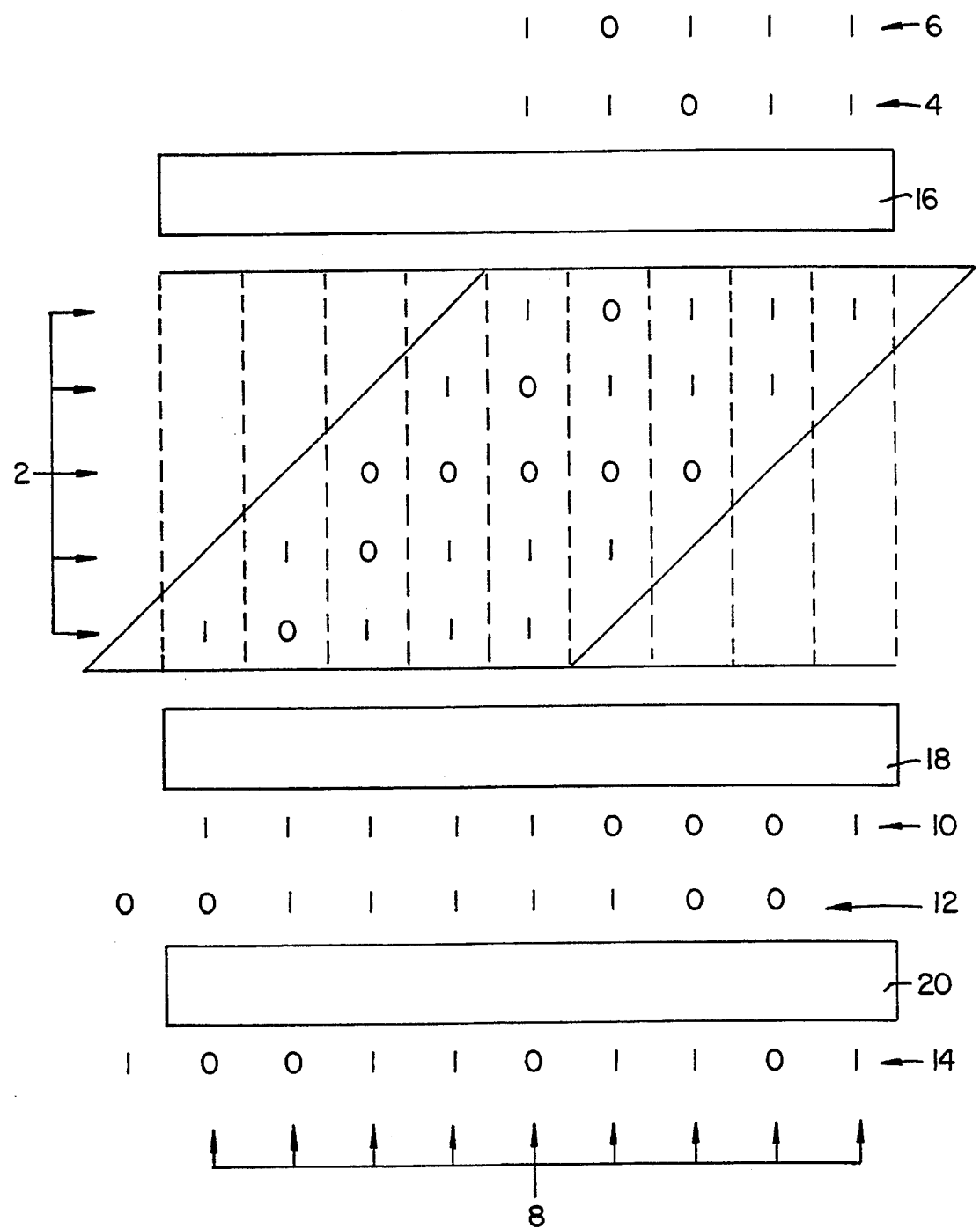
FIG. 1 is an illustration of the binary multiply function and a typical column add function, the Figure illustrating three functional subsections: one-bit multiply, carry-save addition, and carry-look-ahead addition.

An illustration of the binary multiply function, using column addition is shown in FIG. 1. This operation, as presented, is in the usual right to left paper and pencil method, with intermediate rows 2 resulting from the multiplication of one bit from the multiplier 4 times the multiplicand 6. That is, where the multiplier bit is a one, the resulting row 2 is a replica of the multiplicand 6, shifted to the right by the order of the multiplier bit. Where the multiplier bit is a zero, the resulting row 2 is all zeroes. The rows 2 are aligned in columns 8 associated with the power (or order) of the particular bit. There are, as a result of this process, N+M−1 columns 8 (N being the number of bits in the multiplicand 6), in M rows 2 (M being the number of bits in the multiplier 4). In the example, then, there are shown: a five-bit multiplier 4 and a five-bit multiplicand 6; five rows 2, and nine columns 8 of intermediate data representative of the results of the bit-wise multiplication. There are two rows, also of nine bits each, the partial sum 10 and partial carry 12 to be discussed further on. And there is the final sum 14 (ten bits long), the finished result of performing the summation over the columns 8. In digital computers, the binary multiply may be divided into three functional sections, these are: a one-bit multiply array 16, the carry-save adder 18, and the carry-look-ahead adder 20. These are also indicated in the FIG. 1. The one-bit multiplier 16 takes the two input words, the multiplier 4 (M bits) and the multiplicand 6 (N-bits) and performs a bit-wise multiply, yielding N*M values in a rhomboidal array. This makes up the N+M−1 columns 8 of data, which is then the input data to the carry-save adder 18. The carry-save adder 18 performs the basic summing over the data and yields, as an intermediate result, one partial sum bit and one partial carry bit per column 8. This makes up the input data to the carry-look-ahead adder 20. The carry-look-ahead adder 20 performs the final summation, yielding the finished result 14, an N+M bit number. The binary columnar add function is a central calculation in the binary multiply function. The invention treated herein relates specifically to improvements in the structure of the carry-save adder 18 as the columnar adders associated with the binary multiply function.

Wallace-Tree Adder (WTA)

The Wallace-Tree binary adder is tile usual building block in the implementation of the carry-save adder 18 in tile binary multiplier, and is an integral element in the efficient implementation of high-speed binary multipliers. The WTA acts as the column adders for the intermediate calculation as described above, performing the intermediate columnar summation, and yielding one bit partial sum and one bit partial carry per column 8. There is one such WTA per column 8. There are N+M−1 such adders required for an N-by-M bit multiplier 16 with up to N bits of input per WTA. There are several common implementations of a WTA in this type of application, which may or may not use Booth encoding implementation of the WTA using a series of one-bit full adders (FAs) in a tree-like structure is a particular conventional approach considered herein. As will be shown, this implementation yields a plurality of FA stages, the number of which is proportional to the log of the number of input data bits.

One-Bit Full Adder (FA)

Figure 2B:
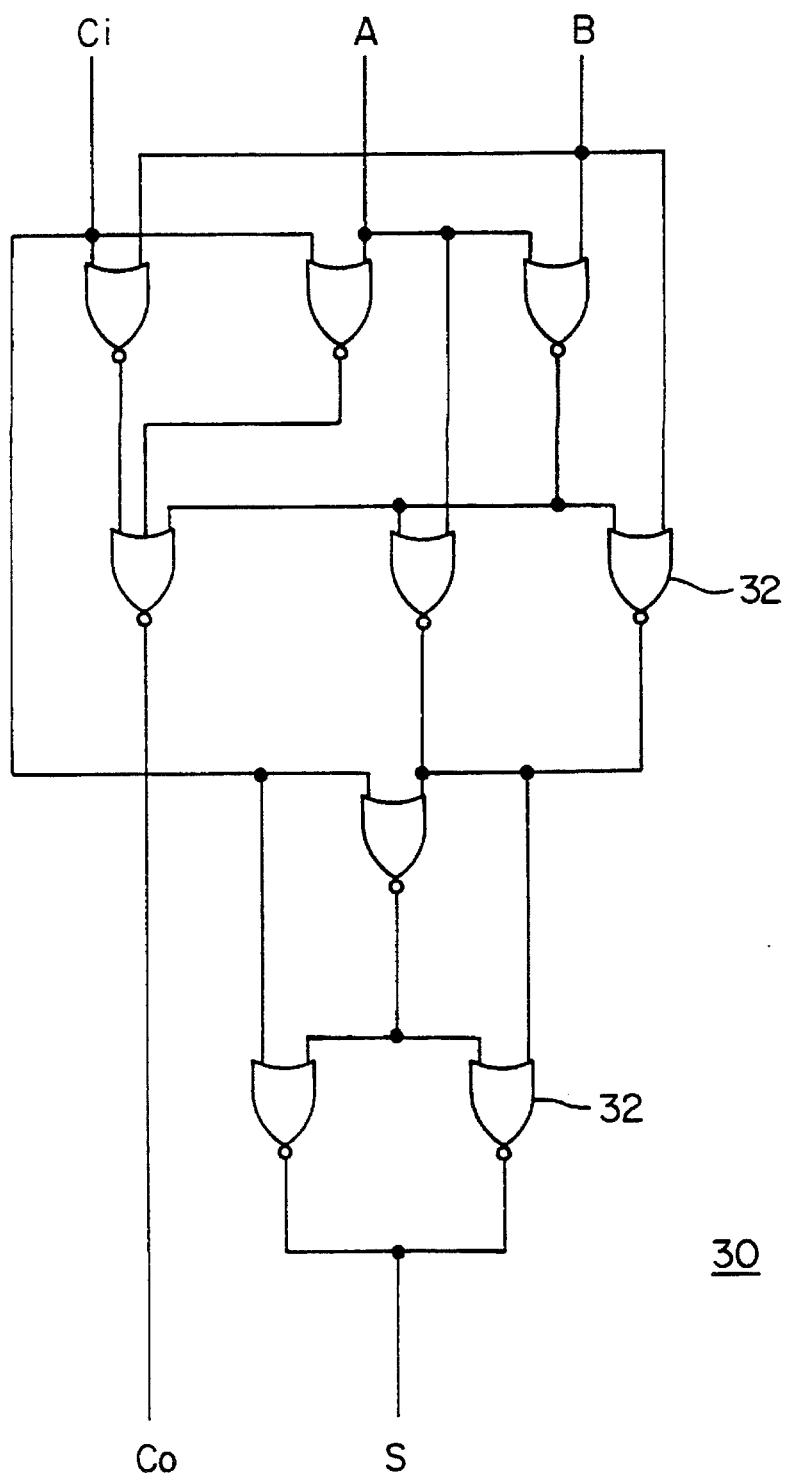
FIG. 2B is a schematic of a one-bit full adder implemented with two- and three-input NOR logic and wired OR logic.

The one-bit full adder (FA) is the conventional basic building block for implementation of the WTA. The fundamental operational characteristics of the one-bit full adder are illustrated in the function table 22 shown in FIG. 2a. The one-bit full adder has the following characteristics: three input data bits yields two output data bits. The input data ports 24 are usually described by characters A, B, and $C_i$ (carry in); the outputs 26 by S(sum) and $C_o$ (carry out). The function table 22 shows the resulting output data as a function of all possible combinations (eight) of three input binary data. The function table 22 also shows that the FA can be described as a binary counter, yielding:

zero (i.e. S=C=0) at the output for all zeroes at the input;

one (i.e. S=1, Co=0) at the output for any single one at the input;

two (i.e. S=0, Co=1) at the output for any pair on ones at the input; and three (i.e. S=Co=1) at the output for all ones at the input.

The function table 22 shows that the FA response is only dependent upon the number of input ones (or zeroes), not upon which port is excited. That is, the FA treats all input ports as equivalent, and thus interchangeable. This is not the case for the output ports, where the characteristics of the S and $C_o$ ports are distinct and cannot be treated as equivalent. A particular implementation of a FA 30 is shown, schematically at the gate level, in FIG. 2b. Here, the FA function is generated using NOR logic elements 32, with inputs ($C_i$, A, and B) and outputs ($C_o$ and S) indicated at top and bottom respectively, the circuit exactly fulfilling the characteristics of the function table 22 for the FA 30. Two- and three-input NOR elements 32 are used, as well as wired OR elements. The characteristics of a NOR logic element 32 are such that the output of a given element achieves a one only if all inputs are set to zero. This particular implementation is used for a throughput speed comparison with a two-column adder discussed further on.

Implementation of the Conventional Wallace-Tree Binary Adder

Figure 3:
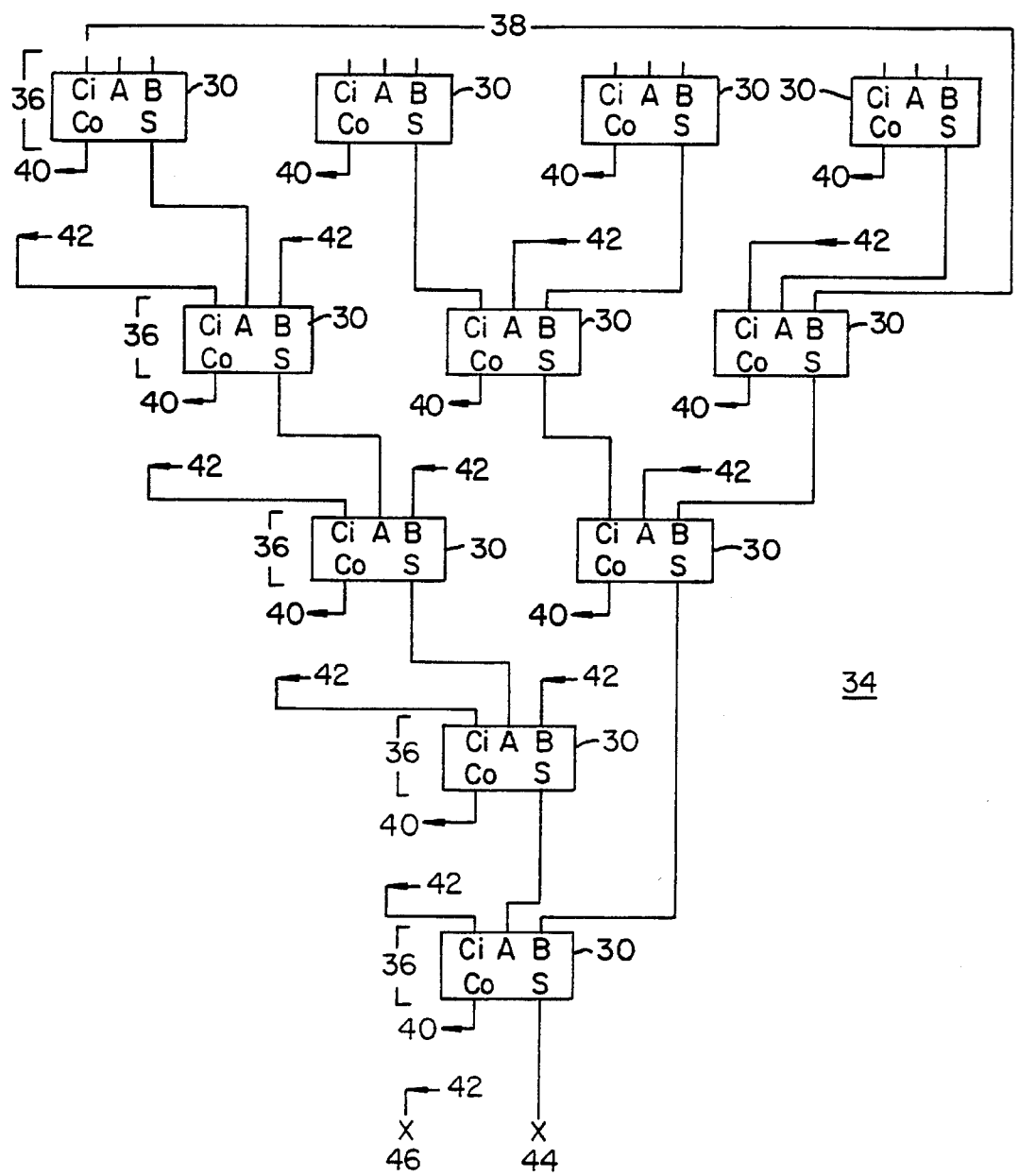
FIG. 3 is a schematic of a Wallace-Tree adder, made up of one-bit full adders which performs the carry-save adder function.

The FA 30 is generally employed as the basic building block in the implementation of the WTA. Such an implementation is discussed herein, and an example implementation of the WTA 34 is shown schematically in FIG. 3. This is a thirteen-bit to two-bit Wallace-Tree adder 34 employing eleven FA elements 30 in five stages 36, and is representative of a conventional configuration for this application. The input terminals 38 for the thirteen input bits associated with a given column 8 are indicated across the top of the figure. Since this circuit is a column adder there is no hierarchy of input bits. That is, any element from the one-bit multiply function for this row can be directed to any convenient input terminal 38. In fact, any particular bit in the column could be input to any of the available input terminals 38. In this example, twelve bits of the input data are processed through the first stage 36 of four FAs 30, one bit is routed directly to the second stage 36. The output of the first stage 36 is reduces the twelve input bits to eight bits with the outputs from each carry-out ($C_o$) port being routed to the next higher order bit column, as indicated with the 40 on the figure. Additional inputs to the second stage 36 come from the $C_o$ ports of the next lower order bit column, as indicated with the 42 on the figure. In like fashion, the second stage 36 processes the input data, resulting in the reduction in the number of bits from nine to six, and so on down to a single FA 30 yielding one partial sum bit 44 and one partial carry bit 46. Furthermore, each carry-out bit from each FA 30 is directed to the next higher order bit column. And, in like fashion, each carry-out result from the next lower order stage is directed into this one.

Figure 4:
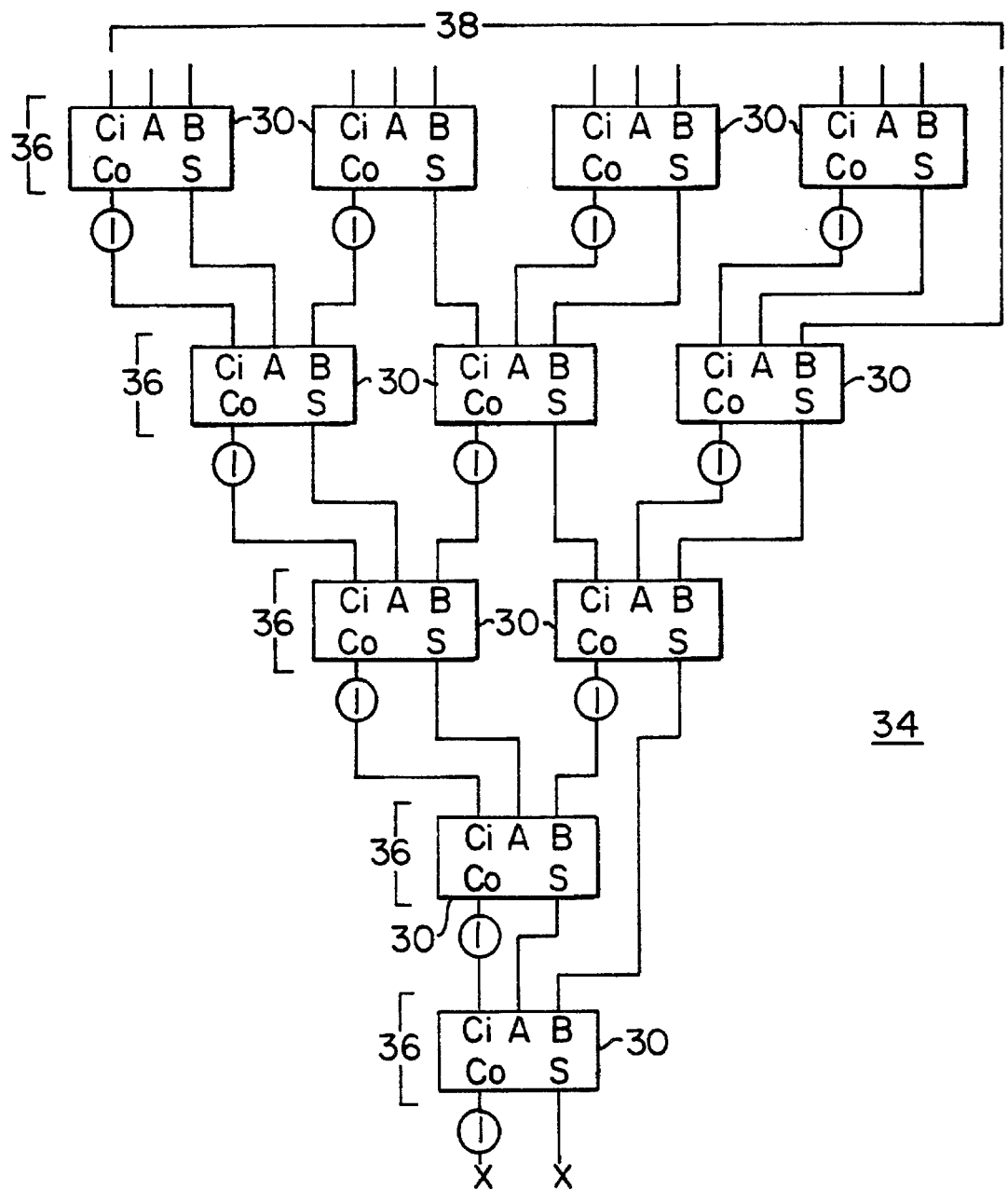
FIG. 4 is a schematic of a Wallace-Tree adder made up of one-bit full adders illustrating a modification to conventional column-to-column nomenclature.

As a means of reducing the complexity of the figures representing the WTA 34 under discussion, a modified scheme for describing the interconnection of the carry-out data to the next higher order bit column and from the next lower order column is shown in FIG. 4. The representation shown as a circle with a number (in this case a 1) replaces 40 and 42. Furthermore, in later discussions, a circle will be shown with the number 2. This means that the interconnection of the carry-out data is to be directed to the second higher order bit column, and that the input is to come from the second lower order bit column. An additional extension will be employed further on; that is the usage of negative numbers inside the circles. This indicates the reverse meaning to the interconnect scheme. For example, with a −1 enclosed, the output data flow is directed "to previous column", and that the input data comes "from next column."

Figure 5:
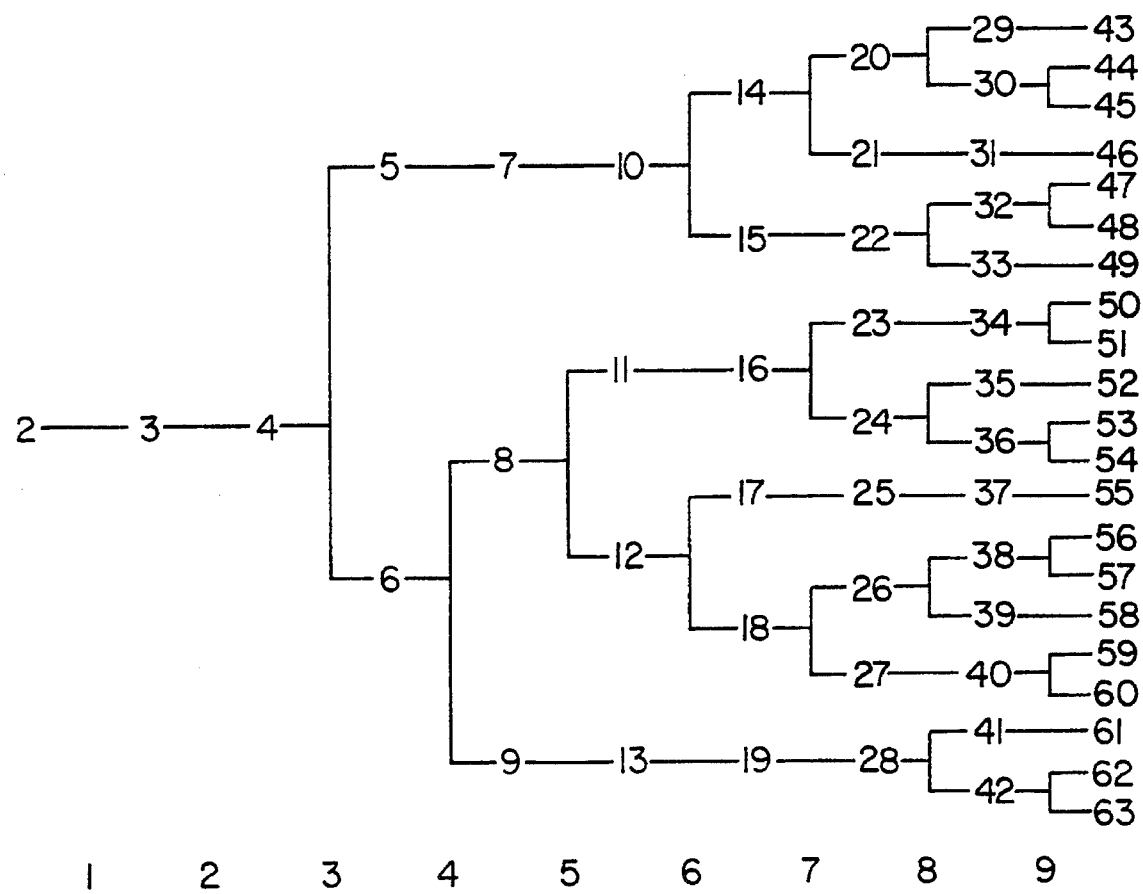
FIG. 5 is a diagram illustrating the number of one-bit full adder stages required in a Wallace-Tree adder as a function of the number of input data bits.

To further illustrate the properties of the WTA containing stages of FA, FIG. 5 is a diagram showing the number of one-bit full adder stages required (1-9 across the bottom) versus the number of input column data bits, from 3 to 63 bits. The figure can be derived by sample layouts for the range of bits, and can be generalized from the fourth bit up as being made up of branches that alternate in a one and two fashion. This figure also shows the maximum number of input bits for a given number of stages. Of note in this regard, is that thirteen bits (our example) is the maximum number of input bits that can be added in the conventional way with a five-stage WTA using FA stages. The three-to-two data bit reduction characteristic of the FA yields a series of stages whose number is proportional to the log of the number of input data bits and whose bit reduction ratio per stage has a maximum value of 1.5.

Two-Bit Full Adder (TFA)

According to the invention, in addition to the one-bit full adder, the two-bit full adder is one of the basic building blocks for implementation of the modified WTA. The fundamental operational characteristics of the two-bit full adder (TFA) are illustrated in the function table 50 shown in FIG. 6A. The TFA has the following characteristics: five input data yield three output data. The input data ports 52 are usually described by characters A0, B0, $C_i$ (carry-in), A1, and B1; the output data ports 54 by S0 (sum zero), S1 (sum 1), and $C_o$ (carry-out). The function table 50 shows the resulting output data as a function of all thirty-two possible combinations of five inputs. The TFA can be thought of as a pair of FAs in parallel, with the carry-out of one FA connected internally to the carry-in of the second FA. This accounts for the five inputs and the three outputs and explains the functional relationship between the inputs and the outputs. Furthermore, the functional characteristics of the TFA also show that a distinction is to be made between the A1 and B1 inputs and the A0, B0, and $C_i$ inputs. That is, the TFA does not treat all input ports as equivalent. The A1, B1 inputs are to be considered as associated with the next higher order bit. As for the outputs, S1 is to be considered as associated with the next higher order bit, and $C_o$ is to be considered to be associated with the second higher order bit. As noted, the TFA can be considered as two FAs in parallel. This effect will be used to advantage and will be discussed further on.

Figure 6B:
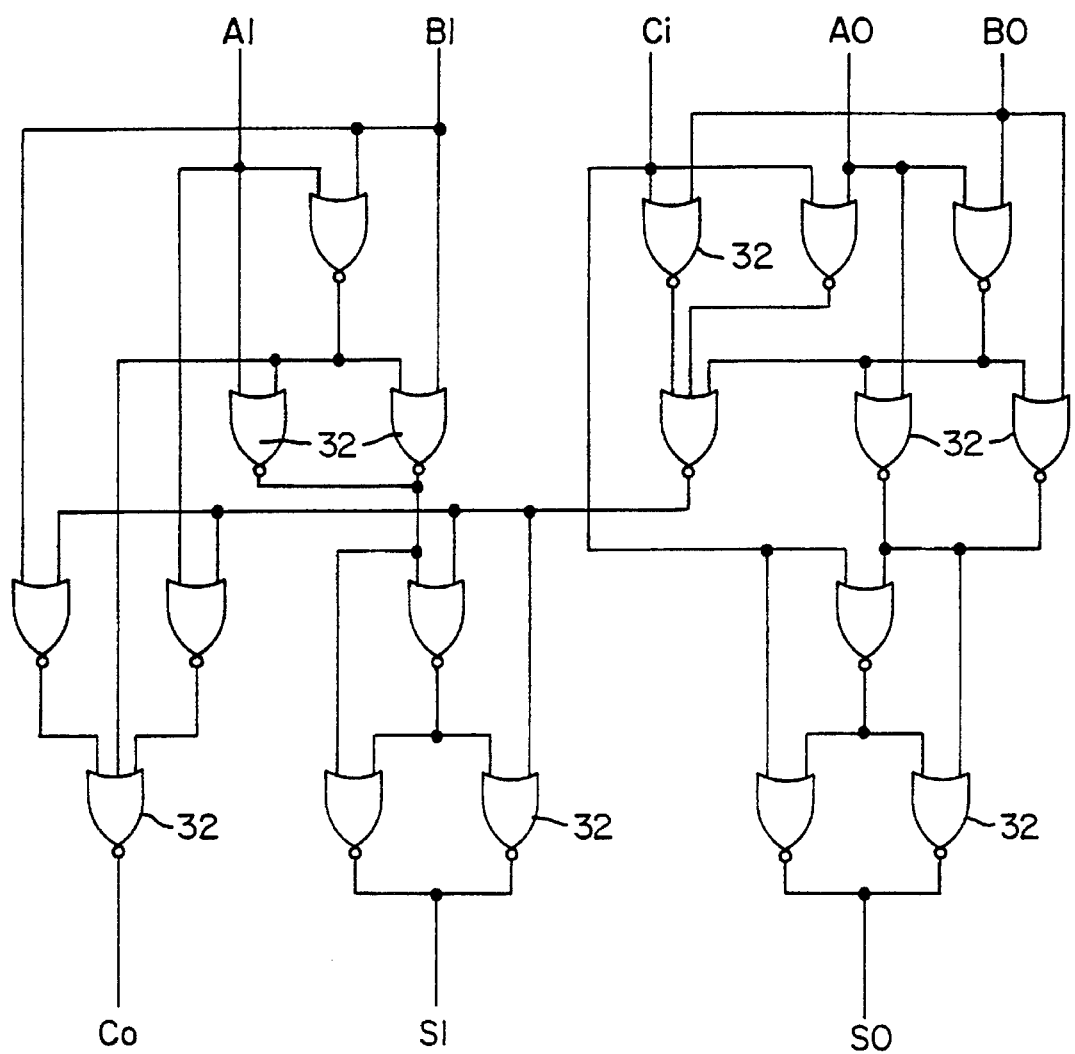
FIG. 6B is a schematic of a two-bit full adder implemented with two- and three-input NOR logic, and wired OR logic.

A particular implementation of a TFA 60 is shown schematically at the gate level in FIG. 6b. As with the FA, the TFA function is generated using NOR logic elements 32 and wired OR elements, with inputs and outputs indicated at top and bottom respectively, the circuit exactly fulfilling the characteristics of the function table 50 for the TFA 60. The particular schematic configuration is shown to clearly show the TFA 60 as a pair of FAs 30 in parallel. Also, this particular implementation can be compared with that of the FA with respect to the number of gate levels required. That is, for both implementations it can be seen that the same number of gate levels, namely four, are required. The argument can then be made that for a given implementation of both kinds of circuits, both devices will provide nearly the same delay time. This has been verified with computer simulations for a specific CMOS implementation. The results of those simulations are shown in table 64 of FIG. 6c for both the FA 30 and the TFA 60. The table 64 shows the worst case delay times from the device inputs to a particular output. The results showed that for the FA, the delay to the sum output was 1.4 nsec, as compared to 1.6 nsec for the delay to the S1 output in the TFA. Though these results are both technology dependent and implementation dependent, they nevertheless provide confirmation of the original assertion that both circuits will perform at essentially the same speed.

Modified Wallace-Tree Adder

An improved version of a carry-save adder can be implemented with modified Wallace-Tree adders. This modification consists of implementing the circuit structure with a mix of FAs and TFAs as appropriate so as to perform the same port-to-port function but with fewer stages employed, and suitable modification to the interconnect circuit topology so as to account for the changes due to the TFA input/output signal requirements. This modification increases the performance of the resulting carry-save adder by reducing the number of stages in the WTA. The modification is illustrated herein by a portion of a thirteen-bit carry-save adder, shown in FIG. 7. This particular WTA circuit 70 is functionally equivalent to an earlier illustration (FIG. 4), but is seen to contain one less stage than the previous, conventional WTA 34. To describe this modified WTA 70, we will start at the output and work backwards. The fourth and final stage 72, provides two output bits, a partial sum 74 and a partial carry 76, and thus is well suited for a FA 30. The input to this stage requires three inputs, and thus a single TFA 60 is well suited as the third stage 78. A key difference between the interconnects for the original WTA 34 and this modified WTA 70 is the manner in which the data is directed to and from the adjacent column adders. For a TFA 60, in addition to the S1 output coming from and going to the next adjacent WTAs, the carry-out, $C_o$, output comes from and goes to the second WTAs apart. Furthermore, and in general, both the inputs, A1 and B1, also come from next higher order WTA. These considerations are illustrated in the interconnect scheme between the third and the fourth stages, 78 and 72, where the outputs from the third stage 78 are seen to be directed as indicated above. Furthermore, the inputs to the fourth stage are as follows:

input to B from S0 of the third stage;

input to A from A1 of the previous lower order WTA; and input to Ci from $C_o$ of the second previous WTA.

Figure 7:
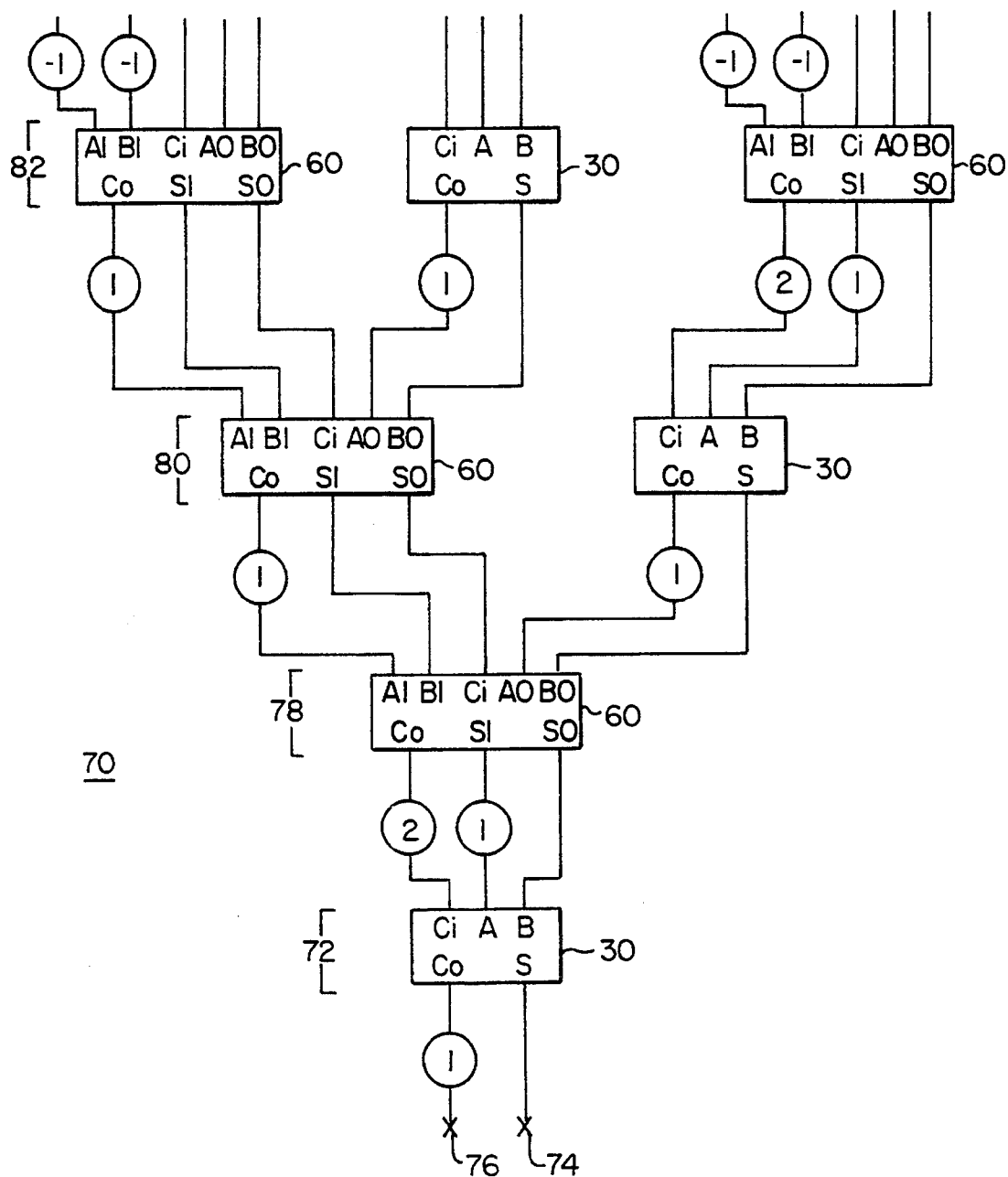
FIG. 7 is a diagram of a modified Wallace-Tree adder incorporating the two-bit full adder.

This is as it should be, for the reasons that the output from S1 of the previous lower order WTA is functionally equivalent to the order of the present WTA, and output from $C_o$ of the next previous WTA is also functionally equivalent for the present WTA. This equivalence is also illustrated in FIG. 7 for the interconnect between the TFA 60 of the second stage 80 and third stage 78. Here, the S1 output, which is at the next higher order bit level is shown connected to the B1 input of the third stage 78. This is as it should be, since the B1 input requires an input from the next higher order bit level.

Starting at the output and proceeding back towards the input, the five required inputs to the third stage 78 naturally call for a pair, one each, of a FA 30 and a TFA 60. The interconnections are made as per the above prescription. Finally, the eight required inputs to the second stage also lead naturally to the institution of two TFA 60 and one FA 30. One FA/TFA pair in the first stage to drive the TFA 60 of the second, and the other TFA 60 for the FA 30 of the second stage 80. The presence of the encircled minus ones at the inputs to the first stage 82 at the A1 and B1 ports is discussed in the following paragraph. Thus, the institution and interconnection of the modified WTA 70 is demonstrated.

The remaining modification to the structure of the carry-save adder configuration is a rearrangement of the manner in which the input column data is distributed. That is, since the A1 and B1 inputs of the TFAs 60 are associated with the next higher order bit level, this requires that the input column data take this into account. And this requirement also establishes the necessity for the encircled minus ones at the inputs to the WTA 70 described above, and shown in FIG. 7.

Figure 8:
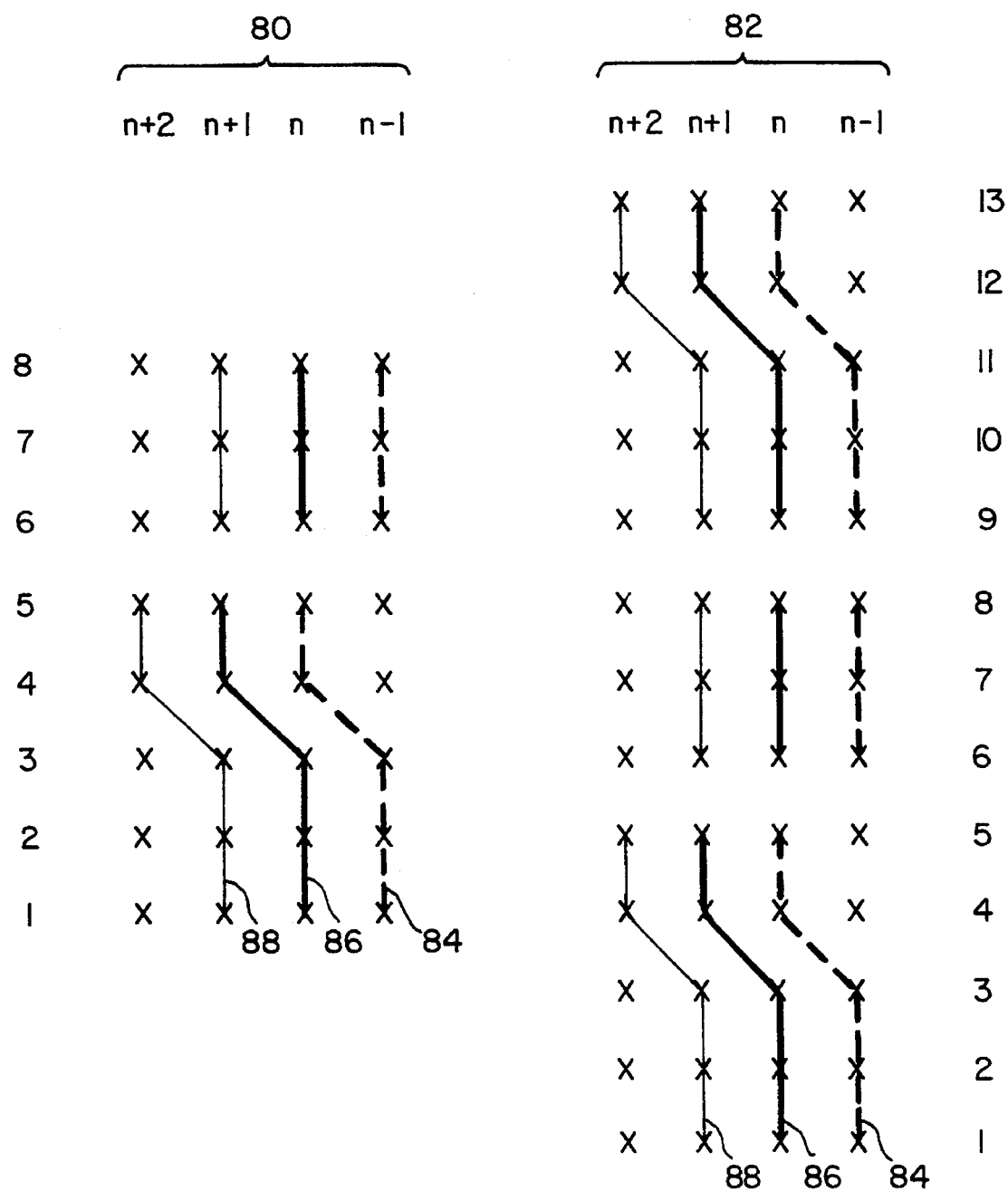
FIG. 8 is a diagram showing the interconnect scheme for the implementation of the two-bit full adder into the modified Wallace-Tree adder for the first two stages of the example.

An illustration of this interconnection scheme is shown in FIG. 8 where the column input data connections for three consecutive modified WTAs 70 are shown, the connections indicated by Xs. This is also a thirteen bit example, showing the connection scheme for inputs to both the first and the second stages, 82 and 80, of each of the modified WTAs 70. The three sets of lines (shaded 84, wide solid 86, and narrow solid 88) represent the input patterns to three individual 13-bit WTAs 70 (i.e., to a first stage comprising two TFAs 60 and an FA 30). Examining the wide solid line 86 in the first stage 82 from bottom to top, there are three inputs from input column n into the one of the TFAs (bits one, two, and three). Then two additional inputs (bits four and five) from input column n+1 into the same TFA, at A1 and B1 inputs, as discussed previously above. Likewise, input bits 4 and 5 of input column n, are shown directed to the A1 and B1 inputs of the adjacent modified WTA (represented by the shaded line), as required by the above-described interconnection scheme. The next three inputs to the WTA represented by the wide solid line (bits six, seven, and eight) are the three inputs of the FA, and therefore all come from input column n. The remaining connections (bits nine through thirteen) replicate the connection of the first five.

The output from the first stage yields eight data bits, with the connection scheme for the inputs shown. The input connection scheme of the second stage 80 is seen to exactly replicate the first eight bits of the first stage, and is a typical connection scheme for eight bits.

Figure 9:
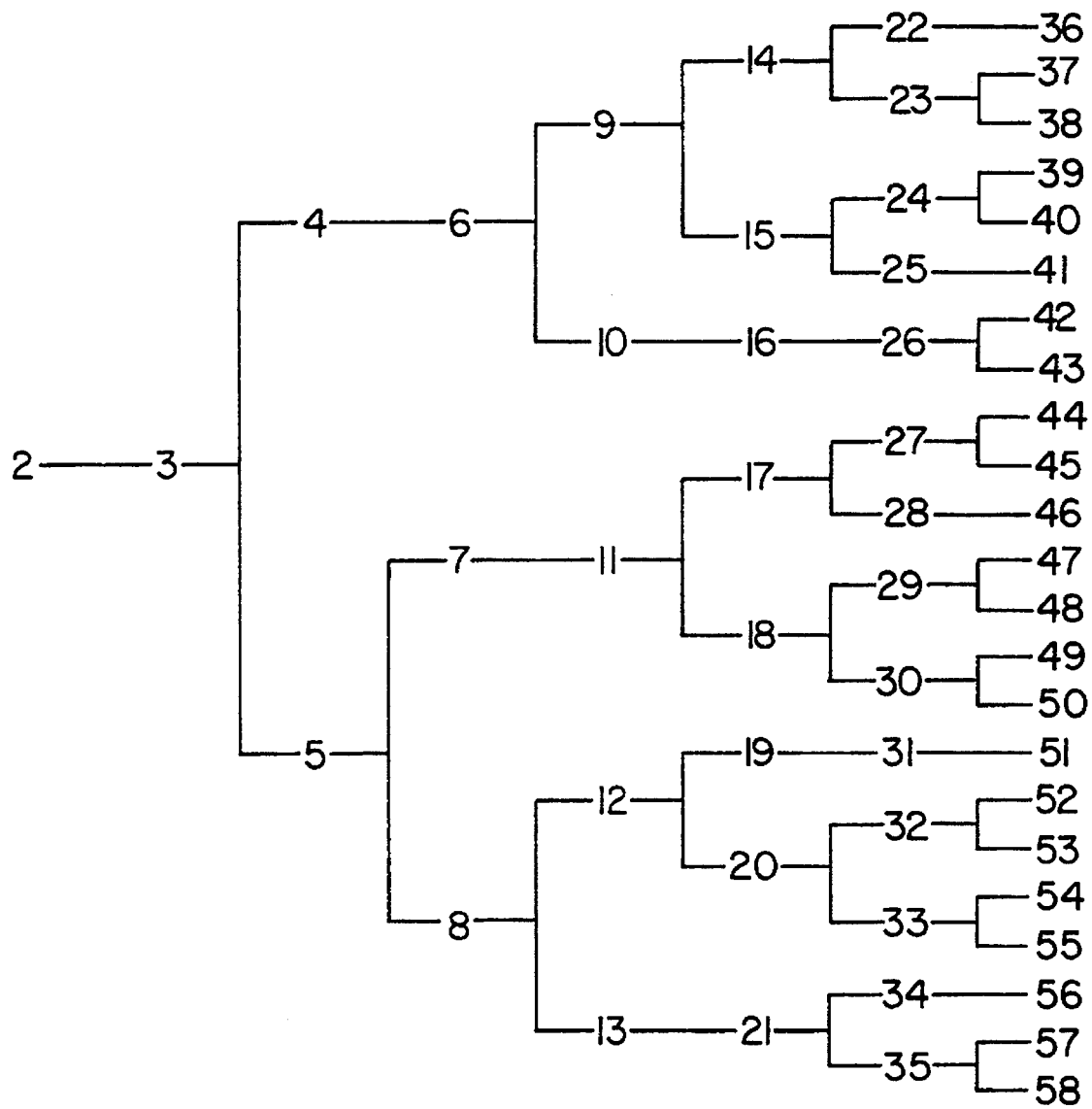
FIG. 9 is a diagram illustrating the number of stages required in a modified Wallace-Tree adder as a function of the number of input data bits.

The properties of the WTA 70 containing stages made up of combinations of TFAs 60 and FAs 30 is further illustrated in FIG. 9. This is a diagram showing the number of required adder stages versus the number of input column data bits, from three to fifty-eight bits. This figure is analogous to FIG. 5. FIG. 9 also shows the maximum number of input bits for a given number of stages. Of note in this regard is that thirteen bits (our previous example) is the maximum number of input bits for a four-stage WTA. This is one stage less than WTA implementation with FA only. This is because the five-to-three data bit reduction ratio per stage has a maximum value of 1.667 as opposed to only 1.5.

We can approximate the number of stages required to reduce N partial sums to only two partial sums for any given Wallace-Tree adder which reduces N-input data to 2-output data by the following equation:

$$(M/P)^{\text{(number of stages)}} = N/2 \quad (1)$$

where M is the number of input bits per individual adder and P is the number of output bits for the adder.

The equation states that the reduction per stage (i.e. M/P) raised to the power of the number of stages equals the input to output ratio. Solving yields:

$$\text{number of stages} = (\log N - \log 2)/(\log M - \log P) \quad (2)$$

This formula is a little optimistic because after each multiply by M/P, the result must be rounded up to the next integer.

Employing the one-bit full adder only, where M=3 and P=2, equation (2) yields:

$$\text{number of stages} = (\log N - 0.30103)/0.17609 \quad (3)$$

Since the number of partial sums eliminated in each stage is no more than ⅓ of those of the previous stage, we see a reduction per stage of 0.33333. In contrast, by employing the two-bit full adder only, where M=5, and P=3, equation (2) yields:

$$\text{number of stages} = (\log N - 0.30101)/0.22185 \quad (4)$$

Since the number of partial sums eliminated in each stage is no more than ⅗ of those of the previous stage, we see a reduction per stage of 0.4. Thus, we see that the reduction ratio (M/P) is a maximum of 20% higher for the two-bit full adder over the one-bit full adder.

As shown above, the five-to-three data bit reduction characteristics of the TFA yields WTA adder stages with higher reduction factor than for WTAs implemented with only FAs. FIG. 10 is a table 90 comparing the number of one-bit full adder stages 92 required in a conventional Wallace-Tree adder and the number of adder stages 94 (as a combination of one-bit full adders and two-bit full adders) required in a modified Wallace-Tree adder versus the number of bits of input data 96. This table 90 presents the same data as shown in FIGS. 5 and 9, but presents it in somewhat different form so as to provide a means of comparing the characteristics of this invention to that of the conventional configuration. The table 90 also shows, in the last column 98, the improvement as the difference between the required number of stages for the conventional configuration versus the improved configuration. There are only four cases where the modified WTA does not reduce the number of stages required; namely: for n, the number of bits, equal to three, four, six, and nine.

Multiplicity of Modified Wallace-Tree Adder Circuit Implementations

There exists a multiplicity of possible circuit implementations associated with each number of column bits to be added. We have used a thirteen bit example because it is a convenient size and illuminates all the salient features of the invention. However, since there are many other possible implementations, we include several more specific examples, as a means of conveying the extent of these possible variations.

The following examines just the possible circuit combinations that can be achieved for the interconnection between an FA/TFA pair and a single TFA. This interconnection may occur throughout a typical WTA implementation, and even occurs naturally as a consequence of the reduction characteristics of these two sets of circuits. On the other hand, there are a multiplicity of possible inter-stage connection schemes that will yield functional equivalency.

For the relatively simple combination of an FA/TFA pair connected to a single TFA, there are ten different interconnect combinations. The possible circuit combinations that can be achieved are described in FIG. 11. That is, each column 102 of the table 100 corresponds to a specific and unique circuit configuration. In as much as the inputs to any three of the inputs of the TFA, A0, B0, or Ci, are equivalent, these are not considered as different circuit configurations. The same is true for the pair of inputs to the TFA, A1 and B1. If these equivalencies were also considered as distinct, then the total possible number of combinations would be multiplied by twelve (i.e. 3! * 2!). The table columns show just the bit level interconnection. That is, there are two possible distinct bit levels into the single TFA; namely: the same column and the next adjacent column(s). These are referred to as a [1] and a [2] respectively, and are associated with the consideration that the same column can be regarded as being, locally: the ones position, [1]; the twos position, [2]. Furthermore, there is the fours position, [4], from the output of a TFA, corresponding to the carry-out of that circuit. There are three distinct output levels from the FA/TFA pair, namely, output from: the same column ([1]), one each from the FA and the TFA; the next adjacent column ([2]), one each from the FA and the TFA; and the second column apart ([4]), one from the TFA for a total of five. In this table 100, the interconnections from the outputs of an FA/TFA pair to the inputs of the following single TFA are shown using the nomenclature expressed above. There are ten different interconnection combinations possible for application of the FA/TFA pair to single TFA bit reduction (i.e., eight inputs to three outputs). For instance, the thirteen bit example (FIG. 7) is connected in the combination expressed in the first column of the figure, namely: [1], [1], [1], [2], and [2]. This configuration is employed between the second and the third stages as well as being employed between the first and second stages.

Figure 12:
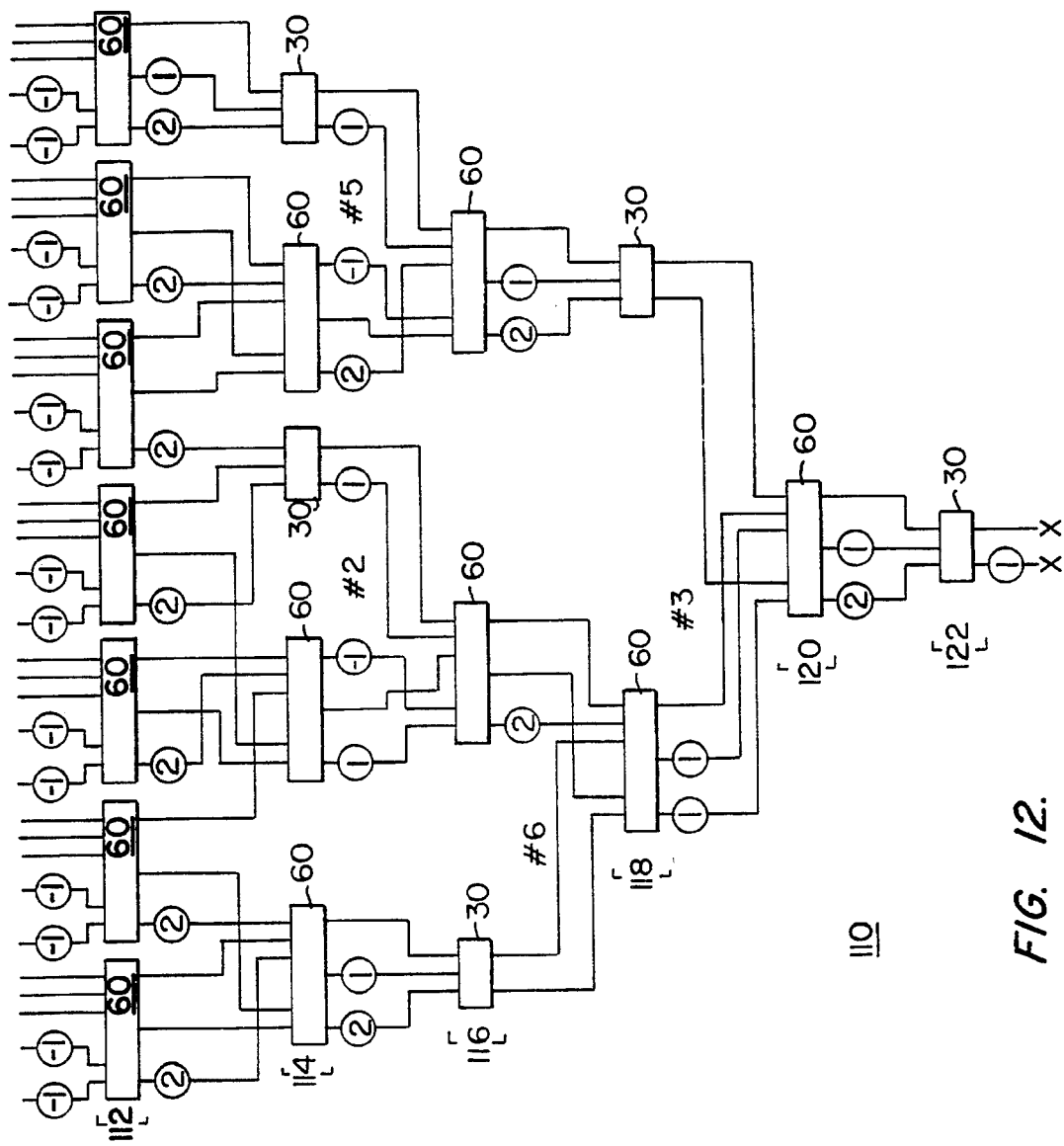
FIG. 12 is a schematic diagram of a thirty-five bit Wallace-Tree adder showing optimum application of two-bit full adder stages, and employing the maximum number of second higher WTA interconnects between first and second stage.
Figure 13:
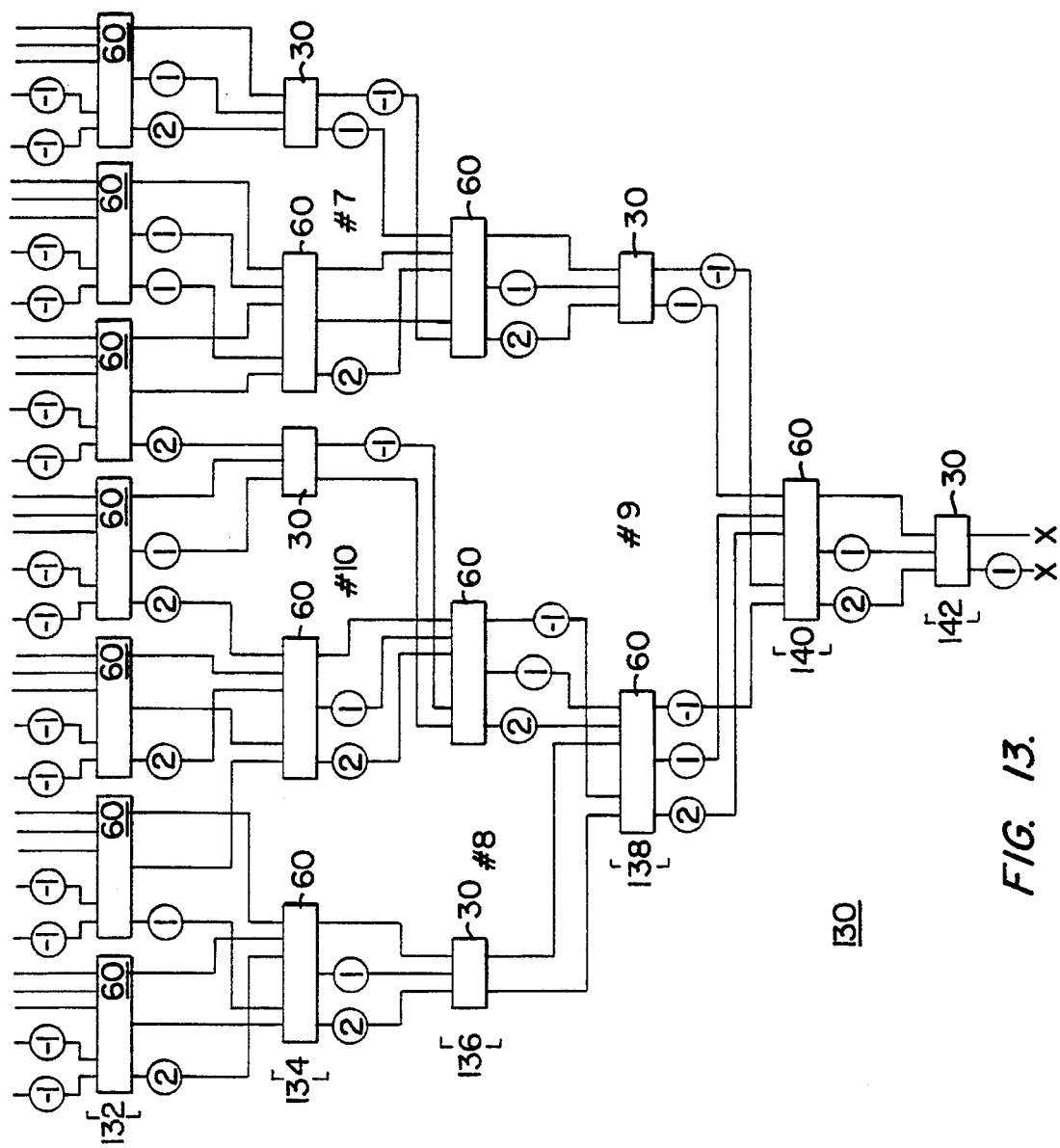
FIG. 13 is a schematic diagram of a thirty-five bit Wallace-Tree adder, illustrating a second variation in the interconnect scheme, and employing a mix of cross WTA interconnects between the first and the second stage.
Figure 14:
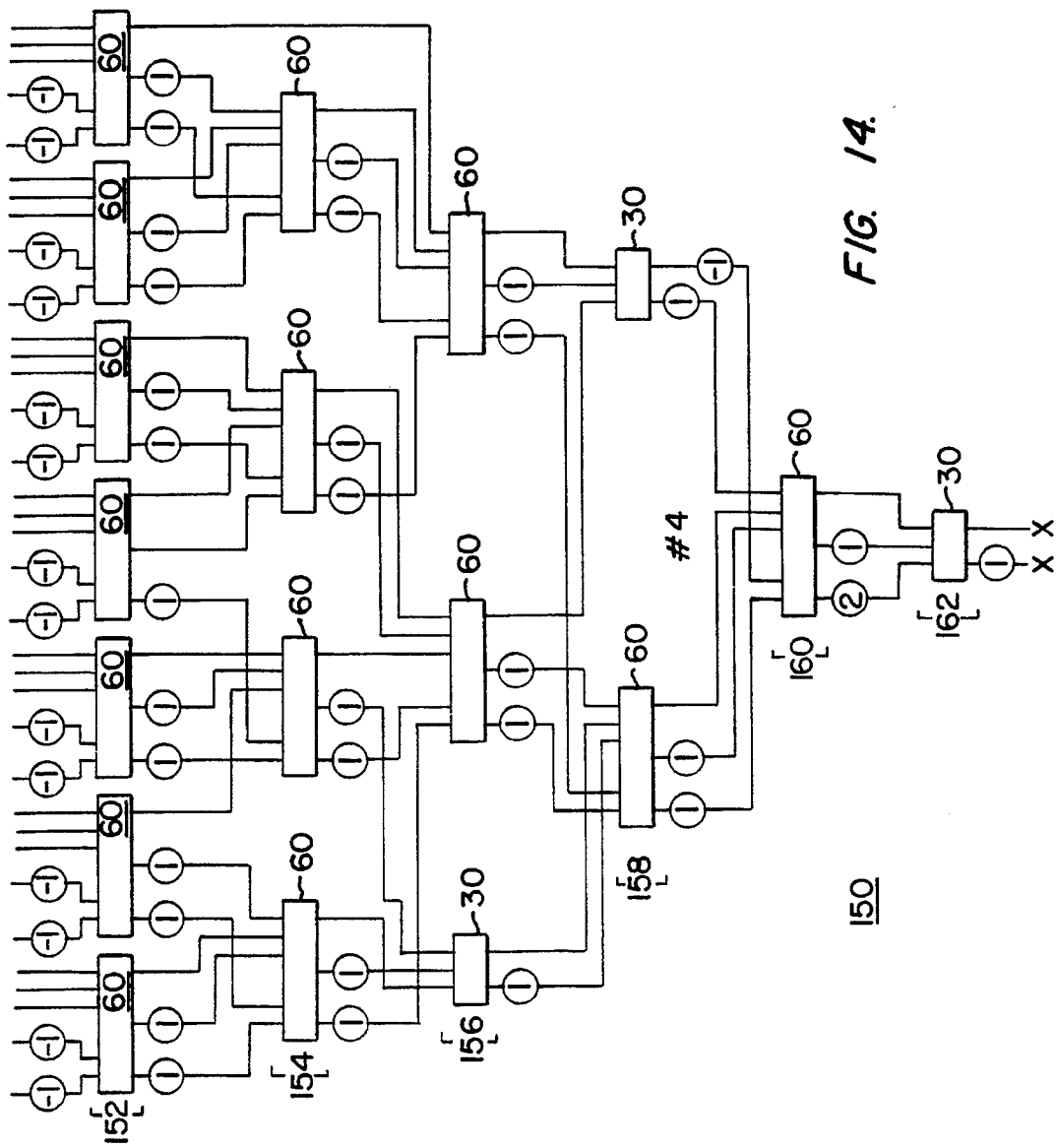
FIG. 14 is a schematic diagram of a thirty-five bit Wallace-Tree adder, illustrating a third variation in the interconnect scheme, employing a maximum number of adjacent cross-WTA interconnects throughout.

As a means of further reducing the complexity of the figures representing the WTA under discussion, in FIGS. 12–14 a modified scheme for representing the FA 30 and TFA 60 subcircuits is employed. That is, the associated terminal designations (i.e., A, A0, etc.) have been removed. This is accounted for in the figures by the prescription that the order of the connections remain the same. That is, for example in the TFA, the input terminals are across the top, and are, from left to right: $C_i$, B1, B0, A1, and A0. And the output terminals are across the bottom, and are, from left to right: $C_o$, S1, and S0.

This representation is illustrated in FIG. 12, which shows another example of the multiplicity of possible interconnect schemes. This example is of a thirty-five bit Wallace-Tree Adder 110. These are six stages of adders 30 and 60, using all TFAs 60 across the first stage, and as such, maximizing the number of bits that can be processed by a six stage adder 110. In this example, a minimum number of interconnects is directed to other WTAs 110 from the outputs of the seven TFAs 60 of the first stage 112 (and inputs to the second stage 114). This is achieved by the maximization of second higher order WTA interconnects (circles with 2s). Four examples of the interconnect possibilities for an FA/TFA pair and a single TFA from FIG. 11 are demonstrated in FIG. 12. These examples are: configuration #3, between stages four and five (118 and 120); #6, between stages three and four (116 and 118); and #2 and #5, between stages two and three (114 and 116), center and right side respectively.

A second example of the thirty-five bit modified Wallace-Tree adder 130 is shown in FIG. 13. This interconnect variation achieves the functional equivalence of the circuit 110 described above (FIG. 12), but in this case uses a mix of cross WTA interconnects for the outputs from the seven TFAs 60 of the first stage 132 (five each circles with 1s and 2s). FIG. 13 shows four more of the interconnection schemes between an FA/TFA pair and a single TFA from FIG. 11. Specifically, configurations #9, #8, #10, and #7 are illustrated between stages four and five (138 and 140), stages three and four (136 and 138), and stages two and three (134 and 136) middle and right hand side respectively.

A third example of the thirty-five bit modified Wallace-Tree adder 150 is shown in FIG. 14. This interconnect variation achieves the functional equivalence of the circuits described above and shown in FIGS. 12 and 13, but in this case, the implementation uses the maximum number of adjacent, next higher order, cross WTA interconnects throughout (adder circles with 1s). The circuit of FIG. 14 also employs one more of the possible interconnection schemes between an FA/TFA pair and a single TFA from FIG. 11. Specifically, configuration #4 is shown illustrated between stages four and five (158 and 160). As a broader illustration of the multiplicity of possible interconnection schemes, consider the second stages (114 and 134) of the thirty-five bit adders 110 and 130 illustrated in FIGS. 12 and 13. There are three TFAs 60 and two FAs 30, which reduce twenty-one bits to thirteen. An alternate equivalent variation is illustrated in the example of FIG. 14. In this example the second stage configuration uses four TFAs 60, which reduce twenty bits to twelve and bypass the twenty-first around the second stage 154 and directly to the input of the third stage 156. This scheme achieves the functional equivalence of the previous combination, yielding a reduction from twenty-one bits from the first stage 152 to an input of thirteen bits to the third stage 156, as required. However, this particular interconnect example eschews altogether, for both the second and the third stages, the use of the FA/TFA pair to single TFA bit reduction scheme employed throughout much of the previous examples. An FA/TFA pair does appear in the third stage 156, but output interconnects cross over to the right side circuit, another FA 30. Furthermore, inputs to the following single TFA come from all of the elements of the third stage (i.e. both TFAs and FA). This is done so as to demonstrate that there is a multiplicity of distinct ways of connecting the FAs 30 and TFAs 60 in a given Wallace-Tree adder and maintaining both the functional equivalence required and a minimum number of stages. This also demonstrates that equivalent interconnection schemes do not depend upon any kind of uniformity, periodicity, repeatability, or inherent subcircuit structure. Indeed, there exists a multiplicity of possible interconnect schemes, not only for a given set of circuit types (like the combination of an FA/TFA pair and a TFA), but also that there are a higher order of combinatorial mixes possible by instituting a multiplicity of combinations of TFAs and FAs as appropriate. Thus, the results as approximated by equation (2) (and given exactly in FIG. 9) are achieved by a multiplicity of possible circuit combinations.

While the invention has been particularly shown and described with reference to specific embodiments thereof, it will be understood by those skilled in the art that the foregoing and other changes in the form and details may be made therein without departing from the spirit or scope of the invention.

What is claimed is:

1. A carry-save adder for summing a plurality of columns of binary data bits and generating a plurality of partial sum results and a plurality of partial carry results, the binary data bits of a particular column being of the same order of magnitude, the binary data bits in different columns differing in order of magnitude, the carry-save adder comprising:

a plurality of one-bit full adders;

a plurality of two-bit full adders, the one-bit and two-bit full adders being configured in a plurality of interconnected column adders, each column adder for summing binary data bits from at least one column and generating a partial sum result and a partial carry result, each column adder having a plurality of stages, each stage comprising a combination of the one-bit and two-bit full adders; and a plurality of conductors for interconnecting the stages of each column adder with other stages in the same column adder and with stages in other column adders in the carry-save adder.

2. A carry-save adder as described in claim 1 wherein each one-bit full adder comprises:

addend input terminals A and B;

a first carry-in input terminal $C_i$;

a first carry-out output terminal $C_o$; and a sum output terminal S.

3. A carry-save adder as described in claim 1 wherein each two-bit full adder comprises:

first addend input terminals A0 and B0;

second addend input terminals A1 and B1;

a second carry-in input terminal $C_i$;

a second carry-out output terminal $C_o$;

a first sum output terminal S0; and a second sum output terminal S1.

4. A carry-save adder as described in claim 1 wherein each column adder comprises:

a first stage for reducing the number of the binary data bits, the binary data bits being from at least one column;

a plurality of intermediate stages for further reducing the number of binary data bits; and a last stage comprising a single one-bit full adder for generating the partial sum and partial carry results.

5. A carry-save adder as described in claim 4 wherein the first stage of each column adder comprises at least one two-bit full adder having higher order input terminals and lower order input terminals, the higher order input terminals receiving first binary data bits having a first order of magnitude, the lower order input terminals receiving second binary data bits having a second order of magnitude, the first order of magnitude being one order of magnitude greater than the second order of magnitude.

6. A carry-save adder as described in claim 1 wherein the conductors connect input and output terminals, the input and output terminals respectively receiving and transmitting binary data bits of the same order of magnitude.

7. A carry-save adder for summing a plurality of columns of binary data bits and generating a plurality of partial sum results and a plurality of partial carry results, the binary data bits of a particular column being of the same order of magnitude, the binary data bits in different columns differing in order of magnitude, the carry-save adder comprising:

a plurality of one-bit full adders, each one-bit full adder having addend input terminals A and B, a first carry-in input terminal $C_i$, a first carry-out output terminal $C_o$, and a sum output terminal S;

a plurality of two-bit full adders, each two-bit full adder having first addend input terminals A0 and B0, second addend input terminals A1 and B1, a second carry-in input terminal $C_i$, a second carry-out output terminal $C_o$, a first sum output terminal S0, and a second sum output terminal S1, the one-bit and two-bit full adders being configured in a plurality of interconnected column adders, each column adder for summing binary data bits from at least one column and generating a partial sum result and a partial carry result, each column adder having a plurality of stages, each stage comprising a combination of the one-bit and two-bit full adders; and a plurality of conductors for interconnecting the stages of each column adder with other stages in the same column adder and with stages in other column adders in the carry-save adder 8. A carry-save adder as described in claim 7 wherein the first stage of each column adder comprises at least one two-bit full adder, A1 and B1 of each two-bit full adder in the first stage receiving first binary data bits having a first order of magnitude from a first column, and A0, B0, and $C_i$ of each two-bit full adder receiving second binary data bits having a second order of magnitude from a second column, the first order of magnitude being one order of magnitude greater than the second order of magnitude.

9. A carry-save adder as described in claim 7 wherein:

each second $C_o$ is connected only to input terminals in the group consisting of A1 and B1 in the stages of the column adder summing the next higher order binary data bits, and A, B, A0, B0, the first $C_i$, and the second $C_i$ in the stages of the column adder summing the second higher order binary data bits;

each first $C_o$ and S1 is connected only to input terminals in the group consisting of A1 and B1 in the same column adder, and A, B, A0, B0, the first $C_i$, and the second $C_i$ in the stages of the column adder summing the next higher order binary data bits; and each S and S0 being connected only to input terminals from the group consisting essentially of A, B, A0, B0, the first $C_i$, and the second $C_i$ in the same column adder, and A1 and B1 in the column adder summing the next lower order binary data bits.

10. A carry-save adder as described in claim 7 wherein the maximum number of binary data bits in each column is 18.

11. A carry-save adder as described in claim 7 wherein the maximum number of binary data bits in each column is 55.

12. A method of summing a plurality of binary data bits comprising the steps of:

organizing the binary data bits into columns, each column containing all of the binary data bits having the same order of magnitude;

inputting each column of binary data bits into at least one of a plurality of column adders, each column adder comprising a plurality of interconnected one-bit and two-bit full adders, each column adder also comprising a plurality of stages, each stage comprising a combination of the one-bit and two-bit full adders;

reducing the number of binary data bits by means of successive stages of the one-bit and two-bit full adders in each of the column adders; and generating a plurality of partial sum results and a plurality of partial carry results.

13. A carry-save adder for summing a plurality of columns of binary data bits and generating a plurality of partial sum results and a plurality of partial carry results, the binary data bits of a particular column being of the same order of magnitude, the binary data bits in different columns differing in order of magnitude, the carry-save adder comprising:

a plurality of one-bit full adders, each one-bit full adder having addend input terminals A and B, a first carry-in input terminal $C_i$, a first carry-out output terminal $C_o$, and a sum output terminal S;

a plurality of two-bit full adders, each two-bit full adder having first addend input terminals A0 and B0, second addend input terminals A1 and B1, a second carry-in input terminal $C_i$, a second carry-out output terminal $C_o$, a first sum output terminal S0, and a second sum output terminal S1, the one-bit and two-bit full adders being configured in a plurality of interconnected column adders, each column adder for summing binary data bits from at least one column and generating a partial sum result and a partial carry result, each column adder having a plurality of stages, each stage comprising a combination of the one-bit and two-bit full adders; and a plurality of conductors for interconnecting the stages of each column adder with other stages in the same column adder and with stages in other column adders in the carry-save adder, the conductors connecting input and output terminals receiving and transmitting binary data bits of the same order of magnitude;

wherein:

each second $C_o$ is connected only to input terminals in the group consisting of A1 and B1 in the stages of the column adder summing the next higher order binary data bits, and A, B, A0, B0, the first Ci, and the second $C_i$ in the stages of the column adder summing the second higher order binary data bits;

each first $C_o$ and S1 is connected only to input terminals in the group consisting of A1 and B1 in the same column adder, and A, B, A0, B0, the first $C_i$, and the second $C_i$ in the stages of the column adder summing the next higher order binary data bits; and each S and S0 being connected only to input terminals from the group consisting essentially of A, B, A0, B0, the first $C_i$, and the second $C_i$ in the same column adder, and A1 and B1 in the column adder summing the next lower order binary data bits.

14. A carry-save adder as described in claim 13 wherein the maximum number of binary data bits in each column is 18.

15. A carry-save adder as described in claim 13 wherein the maximum number of binary data bits in each column is 55.

* * * * *